July 9, 1968  T. F. BELL ETAL  3,391,843
WELDING, SOLDERING AND BRAZING APPARATUS
Filed Oct. 19, 1965  5 Sheets-Sheet 1
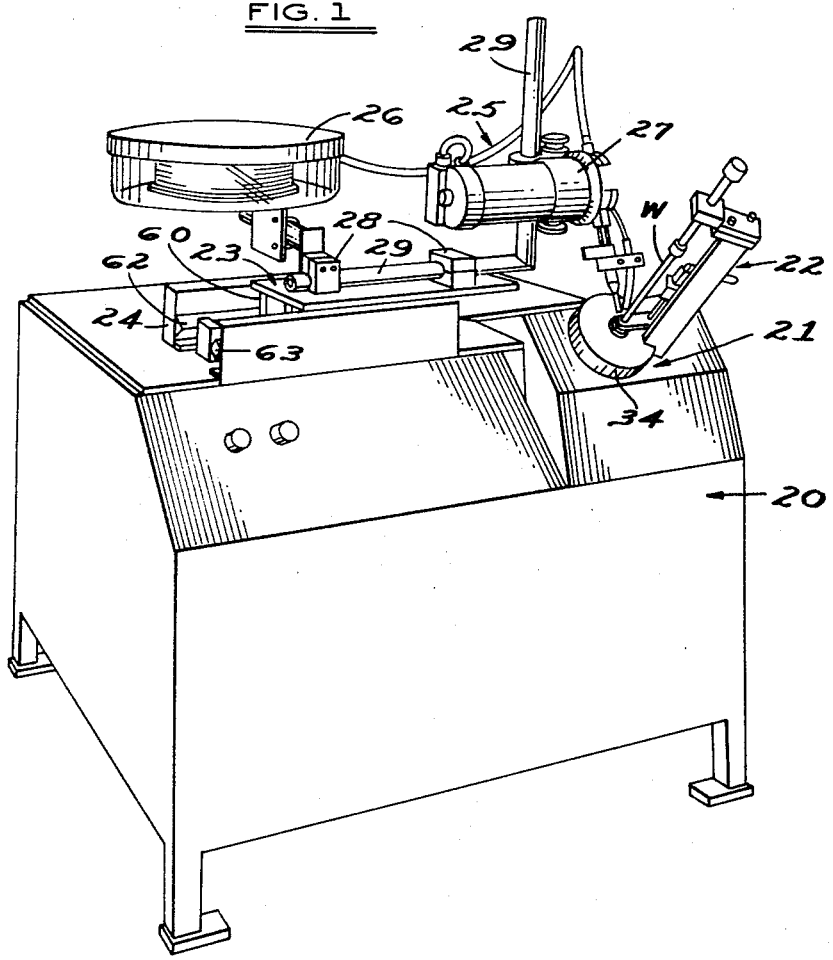
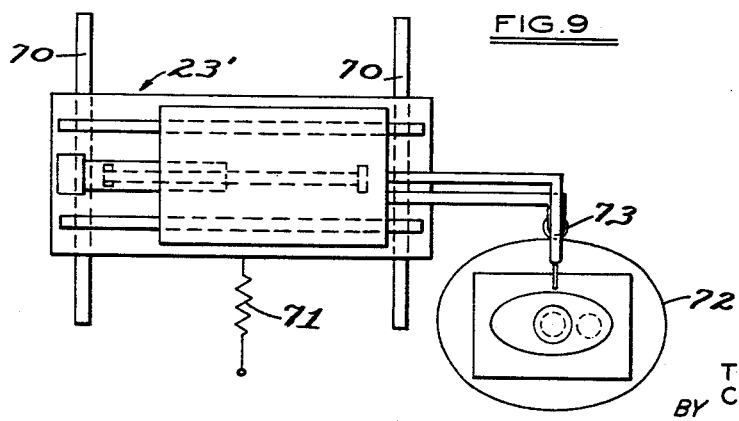
INVENTORS
THEODORE F. BELL
BY CHARLES M. NORLIN
ATTORNEYS

INVENTORS
THEODORE F. BELL
BY CHARLES M. NORLIN

ATTORNEYS

July 9, 1968    T. F. BELL ETAL    3,391,843
WELDING, SOLDERING AND BRAZING APPARATUS
Filed Oct. 19, 1965    5 Sheets-Sheet 3
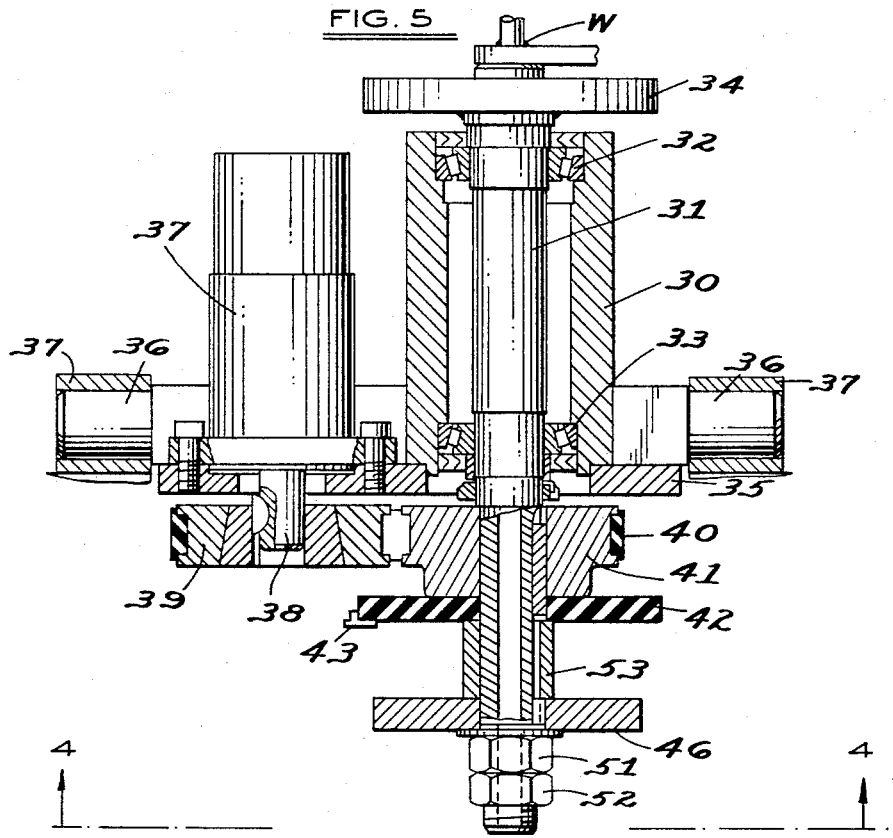
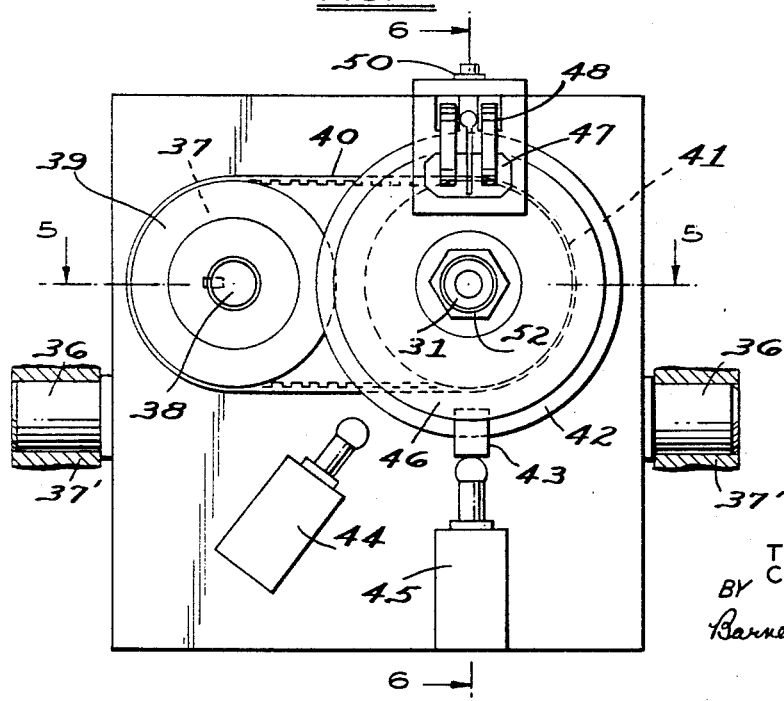
INVENTORS
THEODORE F. BELL
CHARLES M. NORLIN
BY
Barnes, Kisselle, Raisch & Choate
ATTORNEYS July 9, 1968  T. F. BELL ET AL  3,391,843
WELDING, SOLDERING AND BRAZING APPARATUS
Filed Oct. 19, 1965  5 Sheets-Sheet 4
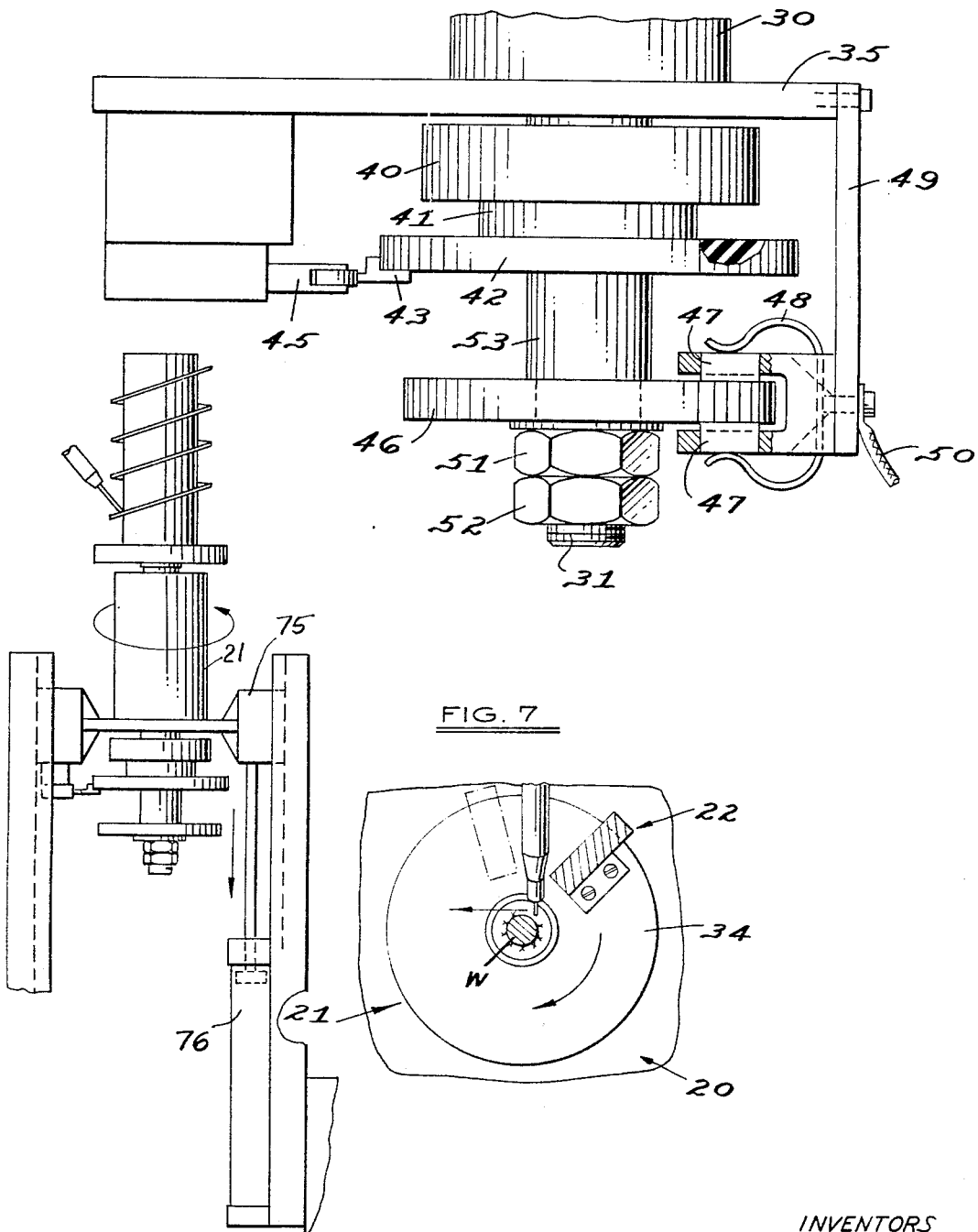
INVENTORS
THEODORE F. BELL
CHARLES M. NORLIN
BY
Barnes, Kisselle, Raisch & Choate
ATTORNEYS July 9, 1968 T. F. BELL ET AL 3,391,843
WELDING, SOLDERING AND BRAZING APPARATUS
Filed Oct. 19, 1965 5 Sheets-Sheet 5
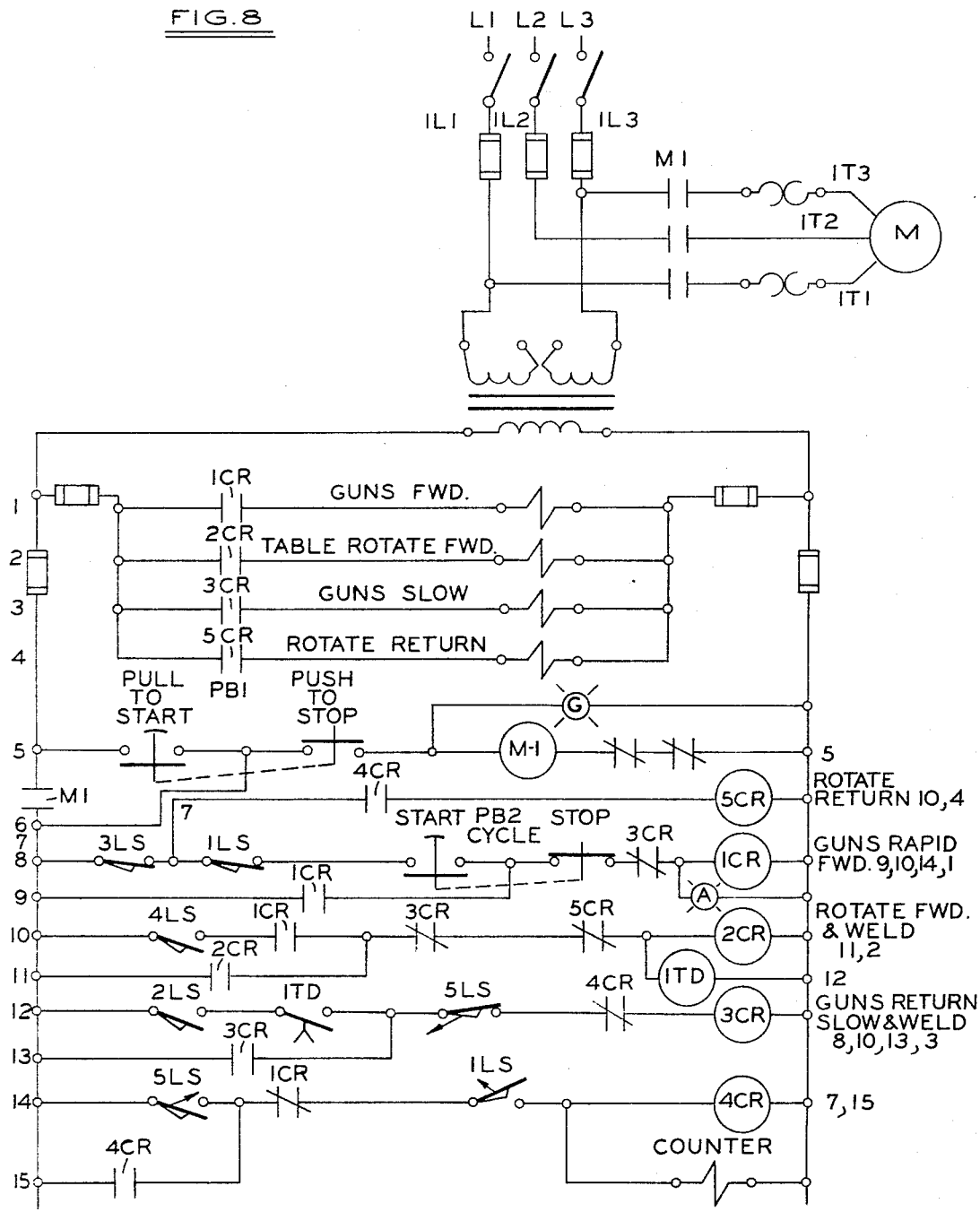
INVENTORS
THEODORE F. BELL
CHARLES M. NORLIN
BY
Barnes, Kisselle, Raisch & Choate
ATTORNEYS

United States Patent Office 3,391,843
Patented July 9, 1968

3,391,843
WELDING, SOLDERING AND BRAZING APPARATUS
Theodore F. Bell, Hazel Park, and Charles M. Norlin, Warren, Mich. (both of 22813 Dequindre, Hazel Park, Mich. 48030)
Filed Oct. 19, 1965, Ser. No. 497,823
11 Claims. (Cl. 228—25)

ABSTRACT OF THE DISCLOSURE

The apparatus disclosed herein comprises a rotary spindle for supporting a workpiece which is driven by a rotary hydraulic motor. A joining apparatus is supported for movement in a tangent direction toward and away from the rotary spindle and is driven by a linear type hydraulic motor.

---

This invention relates to welding, soldering and brazing apparatus.

In the welding, soldering or brazing of various workpieces, it is common to require a joint that follows a geometric path such as circular, rectangular, elliptical or other irregular path which is continuous or intermittent. It has heretofore been necessary to perform such a joining by hand.

It is an object of the invention to provide an apparatus which can perform geometric path welding, soldering or brazing joints along circular, rectangular, elliptical and irregular paths in a continuous or intermittent joint.

It is a further object of the invention to provide such an apparatus which can be readily changed to join workpieces of different configurations.

It is a further object of the invention to provide such an apparatus which can be operated by an unskilled operator.

In the drawings:

FIG. 1 is a perspective view of an apparatus embodying the invention.

FIG. 4 is a bottom plan view taken along the line 4—4 in FIG. 2, parts being broken away.

FIG. 5 is a sectional view taken along the line 5—5 in FIG. 4.

FIG. 6 is a fragmentary sectional view on an enlarged scale taken along the line 6—6 in FIG. 4.

FIG. 7 is a fragmentary plan view of a portion of the device shown in FIGS. 1 and 3 taken along the line 7—7 in FIG. 3.

FIG. 8 is a schematic wiring diagram of the apparatus.

FIG. 9 is a diagrammatic view of a modified form of the apparatus.

FIG. 10 is a diagrammatic view of a further modified form of the apparatus.

Figure 2:
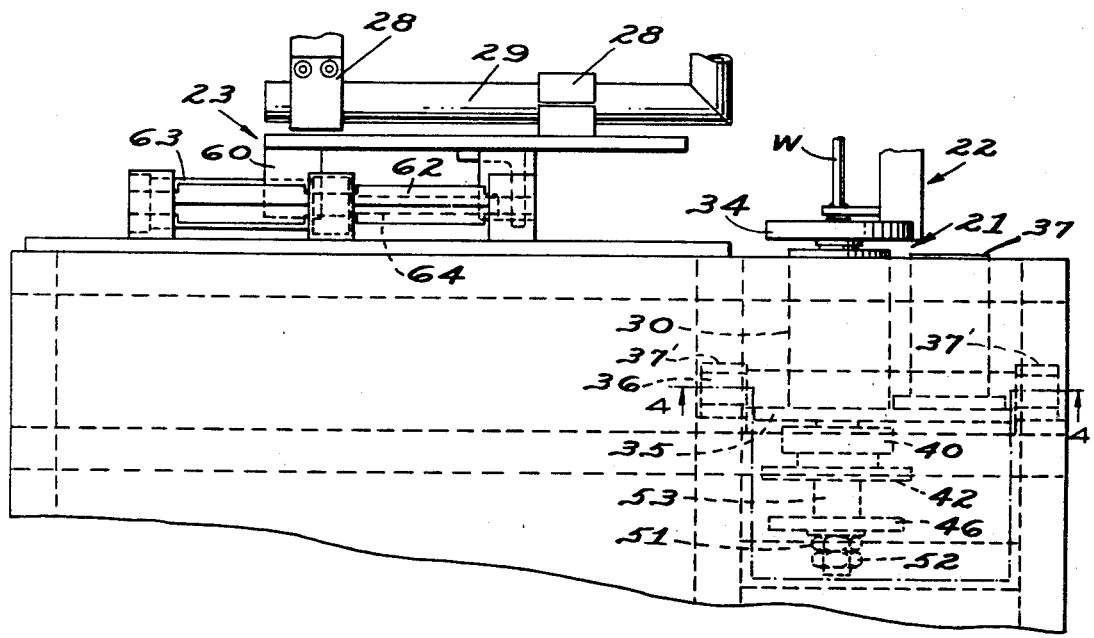
FIG. 2 is a fragmentary front elevational view of the apparatus shown in FIG. 1.
Figure 3:
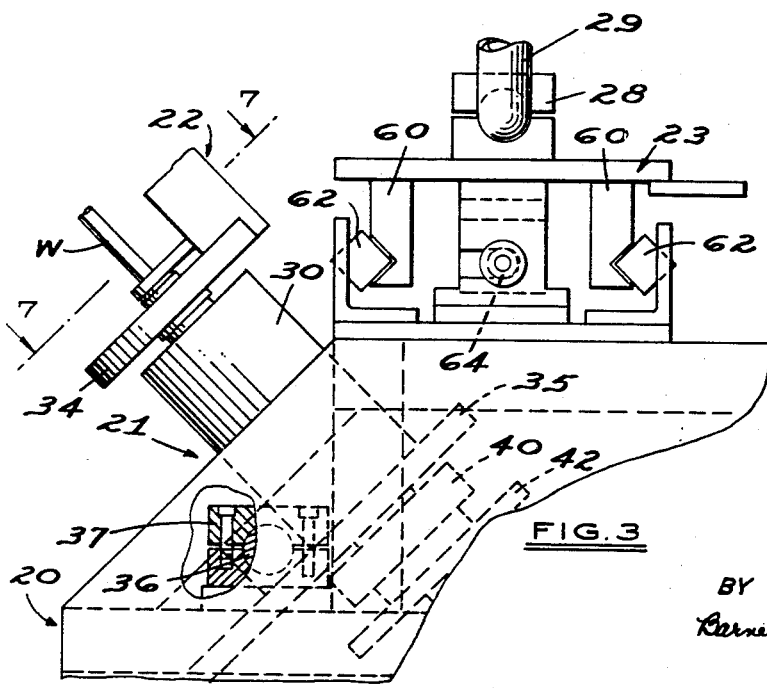
FIG. 3 is a fragmentary end view of the apparatus shown in FIG. 1.

Referring to FIG. 1, the apparatus embodying the invention comprises a frame 20 on which a rotary spindle assembly 21 is mounted. The rotary spindle 21 is adapted to support a workpiece W in position for welding, brazing or soldering by the use of a work support fixture 22.

The welding, brazing or soldering mechanism is mounted on a carriage 23 that is reciprocated on a slide assembly 24 toward and away from the spindle 21. For purposes of illustration, a M.I.G. welding head 25 is supported on the slide 23 and includes a source 26 of welding wire and a power and feed device 27 in accordance with conventional construction. The head 25 is vertically slidable along an upright portion of a bar 29. The bar 29 is angularly adjustable in brackets 28 on slide 23.

Referring to FIGS. 2–6, the rotary spindle assembly 21 includes a housing 30 in which the spindle shaft 31 is mounted for rotation by tapered roller bearings 32, 33. The upper end of the spindle 31 supports a work table 34. The housing 30 is, in turn, mounted on a base plate 35 that has radially extending shafts 36 which are held in clamps. By loosening the screw on the clamps 37', the rotary spindle assembly 21 can be angularly adjusted about the axis of the aligned shafts 36 to vary the position of the plane of the work supporting table 34. The base plate 35 also supports a rotary hydraulic motor 37 which is preferably of the vane type such as made by Char-Lynn Company, Minneapolis, Minn., and designated D4P–F Orbit Motor. The output shaft 38 of the rotary hydraulic motor is keyed to a gear pulley 39 and a toothed flexible belt 40 is trained over the pulley 39 and a second gear pulley 41 on the lower end of the spindle 30.

A disc 42 of insulating material is mounted on the lower end of the shaft and supports a plurality of cams 43 that are adapted to actuate limit switches 44, 45 mounted on the underside of the plate 35 (FIG. 4).

In order to provide a ground or power to complete the circuit for welding, a power plate 46 is supported on the lower end of the spindle 31 and brushes 47 are yieldingly urged against the surfaces of the plate by a generally U-shaped spring 48 mounted on a bracket 49. Power is supplied to the brushes through a connection 50. Nuts 51, 52 threaded on the lower end of the spindle clamp the pulley 41, plate 42, a spacer 53 and plate 46 in position on spindle shaft 31. Power is supplied through the connection 50 to brushes 47 and plate 46. It is transmitted through the spindle shaft 31 to the work table 34.

As shown in FIG. 2, the carriage 23 includes slide blocks 60 having V-shaped surfaces that engage complementary surfaces on slide bars 62. A cylinder 63 has its piston rod 64 connected to the carriage for controlling the movement of the carriage toward and away from the rotary table.

FIG. 8 is a schematic wiring diagram utilizing conventional nomenclature and numbering to designate the various switches that are utilized in the apparatus.

The operation of the apparatus is as follows: To start the motor, switch PB1 is actuated. If the rotary table is back and the slide is back, switch 3LS on plate 35 and switch 1LS along the path of slide 23 are closed. To start the cycle, switch PB2 is manually actuated. The slide 23 will then travel rapidly until switch 4LS is contacted by the slide 23 indicating that the joining head 25 is approaching the work gun cylinder. This actuates contacts 2CR and 1TD to operate cylinder 37 and rotate the rotary table. Switch 1TD applies power. The rotation continues until switch 2LS on plate 39 is contacted and 1TD times out. This reverses the direction of rotation of the rotary table and the slide so that the head 25 returns slowly and welds. When switch 5LS along the path of the slide 23 is contacted by the slide 23, the welding is stopped and the slide 23 is returned rapidly to its neutral position until 3LS is again contacted indicating the slide is back to its original position. The rotary table is returned to its original position until switch 1LS on plate 35 is depressed.

The manner in which the apparatus heretofore described can be utilized in making a complete continuous weld is diagrammatically shown in FIG. 7. As shown in FIG. 7, the rotary work supporting table 34 can only be rotated less than 360° because of the interference of the work supporting bracket 22. In order to complete the weld, the carriage 23 is then moved in the direction of the straight arrow while welding power is supplied to complete the circular weld.

It can be appreciated that by properly controlling the movement of the rotary table 34, the slide 23 and the operation of the joining apparatus on the carriage 23, various intermittent or continuous welds can be provided. In addition, by mounting the carriage for movement in a second direction as shown diagrammatically in FIG. 9 wherein the carriage 23' is mounted on a second pair of tracks 70, the apparatus may be utilized to provide a non-circular weld. Thus, the carriage 23 is yieldingly urged by spring 71 toward a non-circular cam 72 to bring a cam follower 73 into engagement with the periphery of the cam. As the rotary spindle which supports the cam 72 is rotated, the table 23' is moved toward and away from the center of the spindle to produce a non-circular weld corresponding in configuration to the configuration of the cam 72.

In the modified form of the invention shown in FIG. 10, the rotary spindle 21 is mounted on a second slide 75 which is operated by a piston motor 76 so that the spindle can be moved axially. As a result, the workpiece can be rotated and moved axialy at the same time to provide a spiral weld.

As a further modified form of the invention, an additional spindle can be provided adjacent the other end of the carriage 23 and a second joining apparatus 25 can be mounted in position so that a joining operation can be performed on a workpiece at one end of the path of travel of the carriage 23 while another workpiece is being loaded at the other end of the path of travel of the carriage 23.

In each of the forms of the invention, a plurality of movements can be achieved by utilizing a plurality of cams and associated switches.

We claim:

1. In a welding, brazing or soldering apparatus, the combination comprising:
   a rotary spindle for supporting a workpiece,
   means for mounting said spindle for rotation about its axis,
   a rotary hydraulic motor,
   means operatively connecting said spindle and said hydraulic motor,
   a joining apparatus,
   means for supporting said joining apparatus for movement in a tangent direction toward and away from said rotary spindle,
   a linear type hydraulic motor,
   means for operatively connecting said linear hydraulic motor to said joining apparatus whereby said joining apparatus may be moved into position adjacent the workpiece on said rotary spindle,
   said rotary spindle can be rotated and said joining apparatus can thereafter be moved away from said workpiece while the joining apparatus is operating on said workpiece to complete the desired joining.

2. The combination set forth in claim 1 wherein said rotary spindle is angularly adjustable for adjusting the position of its axis in a substantially normal plane relative to the axis of movement of said joining apparatus.

3. The combination set forth in claim 1 including means for applying power to the work holder on said workpiece for welding.

4. The combination set forth in claim 1 including a plurality of spaced limit switches,
   and cam means on said rotary spindle movable therewith for engaging said limit switches,
   said limit switches being operatively connected to valve means for controlling the operation of said rotary hydraulic motor.

5. The combination set forth in claim 1 including limit switches mounted along the path of said joining apparatus,
   valve means for controlling the linear hydraulic motor,
   said limit switches controlling the operation of said valve means.

6. In a welding, brazing or soldering apparatus, the combination comprising:
   a rotary spindle for supporting a workpiece,
   means for mounting said spindle for rotation about its axis,
   a rotary motor,
   means operatively connecting said spindle and said motor,
   a joining apparatus,
   means for supporting said joining apparatus for movement in a tangent direction toward and away from said rotary spindle,
   a linear type motor,
   means for operatively connecting said linear hydraulic motor to said joining apparatus whereby said joining apparatus may be moved into position adjacent the workpiece on said rotary spindle,
   and means for controlling the operation of said rotary motor, linear motor and said joining apparatus such that said rotary spindle can be rotated and said joining apparatus can thereafter be moved away from said workpiece while the joining apparatus is operating on said workpiece to complete the desired joining.

7. In a welding, brazing or soldering apparatus, the combination comprising:
   a rotary spindle for supporting a workpiece,
   means for mounting said spindle for rotation about its axis,
   a rotary hydraulic motor,
   means operatively connecting said spindle and said hydraulic motor,
   means for supporting and moving said spindle and said rotary hydraulic motor axially of said hydraulic motor,
   a joining apparatus,
   means for supporting said joining apparatus for movement in a tangent direction toward and away from said rotary spindle,
   a linear type hydraulic motor,
   means for operatively connecting said linear hydraulic motor to said joining apparatus whereby said joining apparatus may be moved into position adjacent the workpiece on said rotary spindle,
   said rotary spindle can be moved axially and rotated and said joining apparatus can thereafter be moved away from said workpiece while the joining apparatus is operating on said workpiece to complete the desired joining.

8. In a welding, brazing or soldering apparatus, the combination comprising:
   a rotary spindle for supporting a workpiece,
   means for mounting said spindle for rotation about its axis,
   a rotary motor,
   means operatively connecting said spindle and said motor,
   means for supporting and moving said spindle and said rotary motor axially of said motor,
   a joining apparatus,
   means for supporting said joining apparatus for movement in a tangent direction toward and away from said rotary spindle,
   a linear type motor,
   means for operatively connecting said linear hydraulic motor to said joining apparatus whereby said joining apparatus may be moved into position adjacent the workpiece on said rotary spindle,
   and means for controlling the operation of said rotary motor, linear motor and said joining apparatus such that said rotary spindle can be moved axially and rotated and said joining apparatus can thereafter be moved away from said workpiece while the joining apparatus is operating on said workpiece to complete the desired joining.

9. In a welding, brazing or soldering apparatus, the combination comprising.
- a rotary spindle for supporting a workpiece,
- means for mounting said spindle for rotation about its axis,
- a rotary hydraulic motor,
- means operatively connecting said spindle and said hydraulic motor,
- a joining apparatus,
- a slide for supporting said joining apparatus for movement in a tangent direction toward and away from said rotary spindle,
- a linear type hydraulic motor,
- means for operatively connecting said linear hydraulic motor to said slide whereby said joining apparatus may be moved into position adjacent the workpiece on said rotary spindle,
- said rotary spindle can be rotated and said joining apparatus can thereafter be moved away from said workpiece while the joining apparatus is operating on said workpiece to complete the desired joining.

10. In a welding, brazing or soldering apparatus, the combination comprising:
- a rotary spindle for support a workpiece,
- means for mounting said spindle for rotation about its axis,
- a rotary motor,
- means operatively connecting said spindle and said motor,
- a joining apparatus,
- a slide for supporting said joining apparatus for movement in a tangent direction toward and away from said rotary spindle,
- a linear type motor,
- means for operatively connecting said linear hydraulic motor to said slide whereby said joining apparatus may be moved into position adjacent the workpiece on said rotary spindle,
- and means for controlling the operation of said rotary motor, linear motor and said joining apparatus such that said rotary spindle can be rotated and said joining apparatus can thereafter be moved away from said workpiece while the joining apparatus is operating on said workpiece to complete the desired joining.

11. In a welding, brazing or soldering apparatus, the combination comprising:
- a rotary spindle for supporting a workpiece,
- means for mounting said spindle for rotation about its axis,
- a rotary hydraulic motor,
- means operatively connecting said spindle and said hydraulic motor,
- a joining apparatus,
- means for supporting said joining apparatus for movement in a tangent direction toward and away from said rotary spindle and in a radial direction toward and away from said rotary spindle,
- a linear type hydraulic motor,
- means for operatively connecting said linear hydraulic motor to said joining apparatus for moving said joining apparatus in said tangent direction,
- interengaging cam means between said rotary spindle and said joining apparatus for moving said joining apparatus in a radial direction as the rotary spindle is rotated.

References Cited

UNITED STATES PATENTS

| | | | |
|---|---|---|---|
| 1,550,651 | 8/1925 | Charter | 219—124 |
| 2,835,786 | 5/1958 | Launder | 219—124 |
| 3,024,349 | 3/1962 | Hinrichsen | 228—48 |

RICHARD H. EANES, JR., *Primary Examiner.*